Feb. 6, 1962     A. A. BOGDAN     3,019,676
FLY CUTTER WITH MICROMETRICAL ADJUSTMENT
Filed Nov. 4, 1959
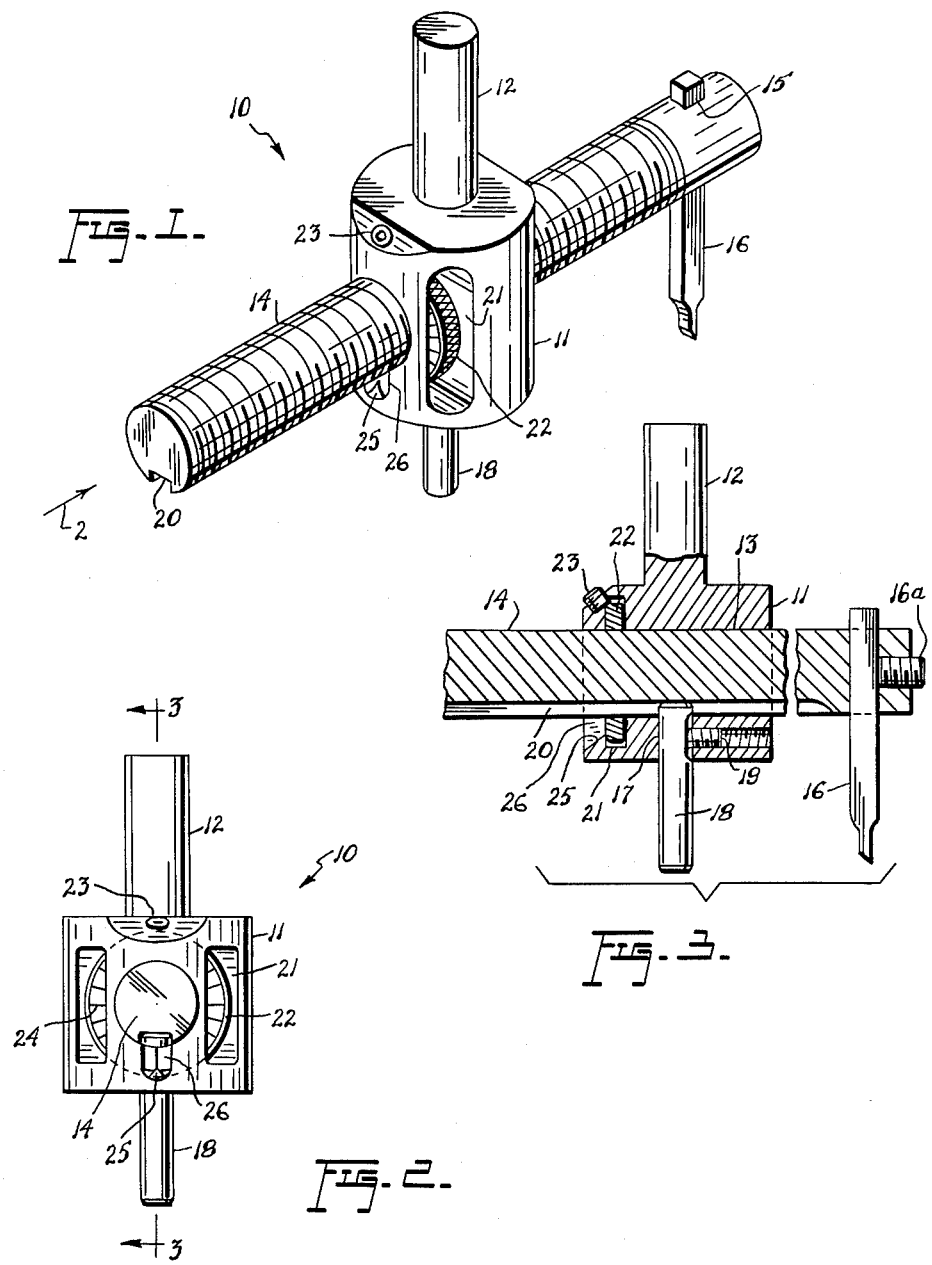
Inventor:
Andrew A. Bogdan United States Patent Office 3,019,676
Patented Feb. 6, 1962

3,019,676
FLY CUTTER WITH MICROMETRICAL
ADJUSTMENT
Andrew A. Bogdan, 3103½ Dubois Ave.,
Baltimore, Md.
Filed Nov. 4, 1959, Ser. No. 850,916
3 Claims. (Cl. 77—77)

This invention relates to new and useful improvements in so-called sweep or fly cutters used for cutting round holes or discs, and the principal object of the invention is to facilitate such cutting to very close tolerances with micrometric precision.

This object is attained by the provision of the instant cutter which includes a body having a mounting shank adaptable to a suitable machine such as a drill press, jig borer, lathe, milling machine, or the like, together with a screw-threaded shaft which is slidably adjustable in the body transversely to the axis of the mounting shank and carries a suitable cutting tool, micrometric means being provided in the body for slidably adjusting the shaft whereby the distance of the cutting tool from the axis of the shank may be very accurately varied, thus correspondingly varying the cutting radius of the tool when the cutter is rotated by the machine with which it is used.

Some of the advantages of the invention reside in its simplicity of construction, efficient and accurate operation, and in its adaptability to convenient and economical manufacture.

With the above more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a perspective view of the micrometer fly cutter in accordance with the invention;

FIGURE 2 is an elevational view thereof, taken in the direction of the arrow 2 in FIGURE 1; and FIGURE 3 is a fragmentary vertical sectional view, taken substantially in the plane of the line 3—3 in FIGURE 2.

Referring now to the accompanying drawings in detail, the micrometer fly cutter in accordance with the invention is designated generally by the reference numeral 10 and embodies in its construction a substantially cylindrical body 11 which is provided integrally at one end thereof with a longitudinally disposed, cylindrical shank 12 coaxial with the body, whereby the entire device may be attached to a suitable machine such as a drill press, jig borer, lathe, milling machine, or the like, for rotation thereby.

The body 11 is also provided with a transverse bore 13, disposed at right angles to the axis of the shank 12, and a screw-threaded shaft 14 is freely slidable in the bore 13. One end portion of the shaft 14 is formed with a socket 15 in which is removably secured by a suitable set screw 16a a suitable cutting tool 16, the latter being disposed in spaced parallel relation to the axis of the body and shank 11, 12. The other end portion of the body 11 is provided with an axial bore 17, receiving a locating pin 18 which projects outwardly from the body in spaced parallel relation to the tool 16, as will be clearly apparent.

The pin 18 is removably held in place by a set screw 19 and the inner end portion of the pin extends into a groove 20 formed longitudinally in the shaft 14, whereby the shaft is prevented from rotating in the bore 13 but is longitudinally slidable therein.

The body 11 is also provided with an open-sided recess 21 which communicates with the bore 13 and accommodates a micrometer adjusting nut 22 which operatively engages the screw-threads of the shaft 14. As is best shown in FIGURE 3, the opposite walls of the recess 21 are in abutment with opposite faces of the nut 22, whereby axial movement of the nut is prevented. However, rotation of the nut will cause longitudinal sliding of the shaft 14, and thus, the distance of the cutting tool 16 from the axis of the body, shank and locating pin 11, 12, 18, respectively, may be varied, so as to correspondingly vary the cutting radius of the tool.

When the device is adjusted to the desired cutting radius, the nut 22 may be locked against rotation by a set screw 23 in the body 11 and it will be also noted that side edge portions of the nut project into the open sides of the recess 21 as is best shown in FIGURE 2, whereby the nut may be rotated with fingers, upon loosening of the set screw 23.

The screw-threads of the shaft 14 and nut 22 are micrometer threads which facilitate adjustment of cutting radius to very close tolerances, and suitable micrometer graduations 24 are marked on the nut so that the setting thereof may be readily determined in relation to a pointer 25 formed integrally in a sight opening 26 with which the body 11 is provided, as shown.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a micrometer fly cutter, the combination of a substantially cylindrical body, a mounting shank provided axially at one end of said body, said body being formed with a tranesverse bore and with an open-sided recess communicating with said bore, said recess having a pair of spaced walls transverse to said bore, a screw-threaded shaft slidable but non-rotatable in said bore, a cutting tool carried by one end portion of said shaft in spaced parallel relation to the axis of said body and shank, a micrometer adjusting nut disposed in said recess in abutment with said walls thereof and operatively engaging said shaft whereby to vary the distance of said tool from the axis of the body and shank, portions of said nut projecting into the open sides of said recess, and a set screw provided in said body and engaging said nut to lock the same against rotation.

2. The device as defined in claim 1 together with a locating pin mounted in and projecting axially from the other end of said body in spaced parallel relation to said tool, said shaft being provided with a longitudinal groove and the inner end portion of said pin extending into said groove, whereby to prevent said shaft from rotating in said bore.

3. The device as defined in claim 1 together with micrometer graduations provided on said nut, said body being provided with a sight opening communicating with said recess, and a pointer provided in said sight opening, said graduations being readable with reference to said pointer.

References Cited in the file of this patent
UNITED STATES PATENTS
2,475,668      Krist _____ July 12, 1949
FOREIGN PATENTS
142,597        Sweden _____ Oct. 20, 1953